United States Patent Office 3,579,423
Patented May 18, 1971

3,579,423
PREPARATION OF TISSUE CULTURE MEDIA
Isao Yamane and Yutaka Matsuya, Sendai, and Katsuhiko Jimbo, Saitama, Japan, assignors to Flow Laboratories, Inc., Rockville, Md.
No Drawing. Filed Dec. 13, 1968, Ser. No. 784,296
Int. Cl. A61k 27/00
U.S. Cl. 195—1.7                                                                 11 Claims

ABSTRACT OF THE DISCLOSURE

A powdered nutrient composition is provided containing most of the nutrition requirements for culturing animal cells and an acidic buffering agent to maintain the pH of an aqueous solution of the composition at 3.5–5.0. This composition can be dissolved in water and sterilized by autoclaving prior to its incorporation in a tissue culture medium. After autoclaving of the nutrient composition, sterile solutions of glutamine and bicarbonate ions are aseptically added to the composition to form a tissue culture medium.

---

The present invention relates to a nutrient composition for use in tissue culture media, and to methods of preparing tissue culture media. More specifically, the invention relates to a powdered, autoclavable nutrient composition that can be used in the production of a sterile medium for culturing animal tissues, and to methods of making animal tissue culture media utilizing the nutrient composition.

Within the last few years there has been an increasing demand for larger and larger quantities of living animal cells, or as they are commonly called, tissue cultures. Mammalian tissue cultures in particular are in high demand for use in medical research and diagnosis, and particularly as substrates for culturing various infectious agents such as viruses.

It is now common practice to serially propagate cell lines derived from normal and malignant mammalian cells in a fluid medium. These cell lines present the opportunity for the study of metabolism at the cellular level in a system in which the cells in the medium can be separately analyzed, balance experiments can be set up, metabolic processes can be examined qualitatively and quantitatively under controlled conditions, and enzymatic activities can be explored.

The preparation of chemically defined media for use with animal tissue cultures has proved undesirably time-consuming and costly, particularly when preparing large quantities of the media.

Large lots of even the most stable solutions cannot be simply mixed and sold, stored, or used because of limitations in the amount of refrigeration space available, problems of microbial contamination, and the technical difficulties involved in the standard sterilization procedure used for such media—filtration-sterilization.

Although filtration-sterilization is a complex, time-consuming and laborious procedure, the heat-sensitive nature of the ingredients of nutrient media make it the only sterilization procedure which can be used. Tissue culture media typically contain ingredients which deteriorate in solution even at relatively low temperatures and deteriorate rapidly at elevated temperatures.

Thus, while autoclaving is a common practice for sterilizing bacteriological media, it has not been used in the past in the production of tissue culture media because of the deleterious effect of heat on the nutrient value of the ingredients of tissue culture media.

It has recently been suggested that the use of pre-mixed, powdered tissue culture ingredients could lead to the more rapid and efficient preparation of culture media. Solutions of such powdered, premixed ingredients must, however, still be sterilized by filtration before they can be used. Thus, these premix procedures do not avoid the need for filtration-sterilization, and hence do not solve the problems which have precluded efficient preparation of tissue culture media.

The present invention eliminates the difficulties and undesirable features of the prior methods of preparing nutrient media for animal cell cultures by providing a thermostable, powdered nutrient composition containing most of the essential components of such media. An important feature of the invention is the discovery that amino acids essential for cell growth in a culture medium, specific vitamins, inorganic salts, and carbohydrate materials can be combined with an acidic buffering agent and autoclaved without destruction of their nutrient function.

The present invention thus includes an autoclavable, powdered nutrient composition for use in an animal tissue culture medium. The nutrient composition comprises (a) a plurality of amino acids selected from the group consisting of arginine, cystine, histidine, isoleucine, leucine, lysine, methionine, phenylalanine, threonine, tryptophan, tyrosine, and valine; (b) a plurality of water-soluble inorganic salts selected from the group consisting of phosphate, calcium, magnesium, and sodium salts; (c) a plurality of water-soluble sources of vitamins selected from the group consisting of choline salts, thiamine, riboflavin, pyridoxal, nicotinamide; pantothenate, folic acid, inositol, and biotin; (d) a source of carbohydrate; and (e) an acidic buffering agent in an amount capable of maintaining the pH of the composition at from about 3.5 to about 5.0 when said composition is dissolved in purified water and autoclaved.

Preferably, the buffering agent comprises a mixture of sodium succinate and succinic acid.

This invention also includes a method of preparing a tissue culture medium comprising (a) dry mixing the ingredients of the homogeneous powdered, nutrient composition described above; (b) adding water to the nutrient composition and autoclaving the resulting solution to produce a sterilized nutrient solution; and (c) aseptically adding to the sterilized nutrient solution sterilized solutions including glutamine and bicarbonate ions to form a medium for culturing animal cells.

In accordance with the principles of the invention, it has been discovered that a majority of the essential ingredients of a tissue culture medium for propagating animal cells can be combined with an acidic buffering agent in the form of a dry powder to produce a nutrient composition which is storage stable and can be autoclaved for sterilization in aqueous solutions. It is, of course, generally desirable to incorporate into the nutrient composition all of those necessary ingredients of a tissue culture medium that can withstand autoclaving at the acidic pH utilized in accordance with this invention.

It will be appreciated, however, that some of the necessary ingredients of a medium, even though autoclavable under the conditions used in this invention can be omitted from the nutrient composition and sterilized separately before incorporation into the culture medium without departing from the principles and spirit of the invention. In general, the nutrient compositions contain a plurality of amino acids, water-soluble vitamins, inorganic salts necessary for culturing animals cells, a source of carbohydrate, and sufficient acidic buffering agent to maintain the pH of the composition at between about 3.5 and 5.0 when the composition is dissolved in purified water.

The essential ingredients of a medium for cell reproduction that can be combined in the dry powder nutrient composition in accordance with this invention include twelve (12) of the thirteen (13) amino acids considered necessary for culturing mammalian cells; namely, arginine, cystine, histidine, isoleucine, leucine, lysine, methionine, phenylalanine, threonine, tryptophan, tyrosine, and valine. Only glutamine of the necessary amino acids is too unstable to be included in the nutrient composition.

The autoclavable nutrient composition of this invention can also include water-soluble sources which supply the essential vitamins for the culture of animal tissue. For example, the following agents are water-soluble sources of vitamins that can be autoclaved in acidic solutions of the nutrient compositions—thiamine, riboflavin, pyridoxal, nicotinamide, calcium pantothenate, folic acid, inositol, choline bitartrate, and biotin.

Inorganic salts incorporated in the nutrient compositions of the invention are water-soluble and preferably in anhydrous form. In general, the inorganic salts used in most of the popular commercial media can be incorporated into the nutrient compositions of this invention, because these salts are thermostable. Suitable salts include sodium chloride, potassium chloride, calcium chloride, magnesium sulfate, and sodium dihydrogenphosphate.

In accordance with the invention, an acidic buffer is present in the nutrient compositions to maintain the pH of the composition, in aqueous solution, at between about 3.5 and 5.0. Optimum results are obtained when the pH of the solution is adjusted to 4.0–4.5 prior to autoclaving, and when a pH outside of this preferred range is used, somewhat large ramounts of vitamins should be included in the composition. The preferred acidic buffering agent includes succinic acid and sodium succinate which are optimally present in a weight ratio of about 3 parts succinic acid to 4 parts sodium succinate. It has been found, for example, that about 100 mg. of sodium succinate and 75 mg. of succinic acid per liter of medium maintain the pH of the solution of the nutrient composition within the desired pH range.

Optionally, a pH indicator, such as phenol red, and heat-stable antibiotics, such as kanamycin, and chloramphenicol can be incorporated into the nutrient composition, if desired.

In accordance with the invention, the ingredients of the nutrient composition are comminuted and mixed to form a dry homogeneous powder. The comminuting and mixing can conveniently be carried out in a ball mill in which the ingredients are ground and agitated by balls or pebbles which can be subsequently separated from the ingredients by a screening operation.

Before grinding the ingredients in the ball mill or the like, all residual water should be removed to avoid caking of the ingredients, which could lead to a non-homogeneous composition. The powdered nutrient composition produced by the grinding and mixing is hygroscopic and should be protected from moisture during storage.

The powdered, homogeneous nutrient compositions can be stored for long periods of time at low temperatures. Suitable storage temperatures include, for example, $-20°$ C. or $4°$ C.

Solutions of tissue culture media can be prepared just prior to their use by combining (a) an autoclaved solution of the above-described nutrient composition, (b) a separately sterilized bicarbonate solution, and (c) a filtration-sterilized glutamine solution. Optionally, other ingredients may be added to the tissue culture medium at this stage, such as, for example, an antibiotic and/or serum.

To prepare the nutrient solution to be incorporated into the tissue culture medium, the powdered nutrient composition is first incrementally added with stirring to an appropriate quantity of water. When the powder is completely dissolved, the resulting acidic solution is autoclaved. Generally, exposure to pressurized steam at from 120 to 125° C. for from 15 to 20 minutes is sufficient to sterilize the acidic solution and yet not interfere with the nutrient function of the solution ingredients.

The bicarbonate solution incorporated in the tissue culture medium is prepared and autoclaved separately because the alkalinity of the bicarbonate would interfere with the desired acid pH of the nutrient composition during autoclaving. A 10% by weight sodium bicarbonate solution can conveniently be used. It will be appreciated, however, that the concentration of the bicarbonate solution is not critical.

The glutamine solution is also separately prepared and is sterilized by filtration. Conventional filtration techniques and equipment can be utilized.

In the final step of the preparation of the medium, both the sterilized bicarbonate solution and the sterilized glutamine solution are aseptically added to the autoclaved nutrient solution which forms the main component of the medium. A sufficient amount of bicarbonate solution is added to adjust the medium to a pH of 7.2 to 7.4.

For a clearer understanding of the invention, specific examples of it are set forth below. These examples are merely illustrative and are not to be understood as limiting the scope and underlying principles of the invention in any way. All parts and percentages are by weight unless otherwise specifically indicated.

EXAMPLE 1

A modified form of Eagle's M.E.M. culture medium for mammalian cells is prepared by combining the components listed in Table I below.

TABLE I

| Components | Mg./liter | Mg./100 liters |
|---|---|---|
| Arginine | 105 | 10.5 |
| Cystine | 24 | 2.4 |
| Histidine | 31 | 3.1 |
| Isoleucine | 52 | 5.2 |
| Leucine | 52 | 5.2 |
| Lysine | 58 | 5.8 |
| Methionine | 15 | 1.5 |
| Phenylalanine | 32 | 3.2 |
| Threonine | 48 | 4.8 |
| Tryptophan | 10 | 1.0 |
| Tyrosine | 36 | 3.6 |
| Valine | 46 | 4.6 |
| Glucose | 1,000 | 100.0 |
| NaCl | 6,800 | 680.0 |
| KCl | 400 | 40.0 |
| CaCl$_2$ | 200 | 20.0 |
| MgSO | 93.5 | 9.35 |
| NaH$_2$PO$_4$ | 115 | 11.5 |
| Kanamycin | 60 | 6.0 |
| Phenol red | 6 | 0.6 |
| Sodium succinate | 100 | 10.0 |
| Succinic acid | 75 | 7.5 |
| Thiamine | 1 | 0.1 |
| Riboflavin | 0.1 | 0.01 |
| Pyridoxal | 1 | 0.1 |
| Nicotinamide | 1 | 0.1 |
| Pantothenate | 1 | 0.1 |
| Folic acid | 1 | 0.1 |
| Inositol | 2 | 0.2 |
| Choline bitartrate | 1.80 | 0.180 |

The phosphate, calcium, and magnesium salts are provided in their anhydrous form, and the most massive component, sodium chloride, is dehydrated as completely as possible before mixing. Choline bitartrate is used instead of the usual choline chloride to avoid the latter's highly hygroscopic properties. The amount of the pH indicator, phenol red, is decreased to six (6) milligrams per liter of medium and heat-stable kanamycin is added in the amount of sixty (60) milligrams per liter of medium as an antibiotic. Succinic acid and sodium succinate are added in amounts sufficient to maintain the pH of an aqueous solution of the powdered nutrient composition at about 4.2. All the other components of the medium are the same as those present in conventional MEM culture medium prescription.

The nutrient composition is premixed in a ball mill to form a powdered homogeneous solid composition which is storage stable. Just prior to use of the medium, the powdered nutrient composition is dissolved in aliquot volumes of distilled water and autoclaved.

A ten (10%) percent bicarbonate solution is autoclaved separately in a pressure-plug vaccine vial, and a six (6%) percent glutamine solution is sterilized through a Seitz filter.

The sterilized bicarbonate solution and glutamine solution are then aseptically added to the autoclaved main portion of the medium in the amounts called for in the standard MEM formula. The pH of the product medium is about 7.3.

The growth of baby hamster lung cells (primary culture) and L cells was examined with this medium, and the results are presented in Tables I(a), I(b), and I(c) in comparison with the growth of these same cells in standard filter-sterilized MEM. As shown in these tables, the medium including the autoclaved nutrient composition of this invention can support the growth of the cell lines with the same effectiveness as filter-sterilized MEM. Moreover, nutrient media prepared in accordance with the invention supports clonal growth of diploid, primary and heteroploid cells, including, for example, WI-38, monkey kidney, bovine embryonic kidney, rabbit kidney, human embryonic kidney, H. Ep-2, HeLa, and L-929 cell lines. This media achieves high plating efficiencies on the order of 88 to 100% with all of such cell lines. The media can be employed as a routine laboratory medium.

TABLE I(a).—BABY HAMSTER LUNG CELLS (Primary 5-day culture)

| | Cells/dish×$10^4$ |
|---|---|
| Inoculum | 3 |
| 20% serum control, medium sterilized by filtration | 49 |
| 20% serum medium including autoclaved powder | 75 |

TABLE I(b).—L CELLS 7-DAY CULTURE

| | Cells/dish×$10^4$ |
|---|---|
| Inoculum | 1 |
| 2% serum control, medium sterilized by filtration | 30 |
| 2% serum medium including autoclaved powder | 28 |

TABLE I(c).—L CELLS 7-DAY CULTURE

| | Cells/dish×$10^4$ |
|---|---|
| Inoculum | 1 |
| Serum-free control, medium sterilized by filtration | 20 |
| Serum-free medium including autoclaved powder | 21 |

EXAMPLE 2

The pH of solutions of nutrient compositions containing the ingredients listed in Table I are varied by incorporating varying amounts of buffering agent. The effect of the pH of these solutions during autoclaving is shown in Table II, which reports the yield of cells from media including the autoclaved nutrient composition. This yield is found to be highest when the pH of the solution of the nutrient composition is adjusted to 4.0–4.5 before autoclaving. When the pH of the solutions of the nutrient compositions are maintained within this range, the resulting media are comparable in efficiency with media prepared by the prior laborious filtration-sterilization procedure.

TABLE II

| pH of medium before autoclaving: | Cell yields per dish×$10^4$ |
|---|---|
| 5.5 | 4 |
| 5.0 | 21 |
| 4.5 | 42 |
| 4.0 | 47 |
| 3.5 | 24 |

EXAMPLE 3

A nutrient composition is formed from the basic components of medium BME, as listed in Table III below. The general procedure for making the composition is the same as that described in Example 1. The composition is then combined with an autoclaved 10% solution of sodium bicarbonate and a filtration-sterilized 6% solution of glutamine in the manner described in Example 1.

TABLE III

| Components: | Mg./liter |
|---|---|
| Arginine | 21 |
| Cystine | 12 |
| Histidine | 9.6 |
| Isoleucine | 26.2 |
| Leucine | 26.2 |
| Lysine | 36.5 |
| Methionine | 7.5 |
| Phenylalanine | 16.5 |
| Threonine | 23.8 |
| Tryptophan | 4.1 |
| Tyrosine | 18.1 |
| Valine | 23.4 |
| Glucose | 1000 |
| NaCl | 6800 |
| KCl | 400 |
| $CaCl_2$ | 200 |
| $MgSO_4$ | 93.5 |
| $NaH_2PO_4$ | 115 |
| Sodium succinate | 100 |
| Succinic acid | 75 |
| Thiamine | 1 |
| Riboflavin | 0.1 |
| Pyridoxal | 1 |
| Nicotinamide | 1 |
| Pantothenate | 1 |
| Folic acid | 1 |
| Inositol | 2 |
| Choline bitartrate | 1.80 |
| Biotin | 1 |

The product medium including the autoclaved nutrient composition supports the growth of a variety of human, hamster, and rat cells as efficiently as filtration-sterilized BME medium.

The invention in its broader aspects is not limited to the details shown and described, and departures may be made from such details without departing from the principles of the invention and without sacrificing its chief advantages.

What is claimed is:

1. An autoclavable nutrient composition for use in an animal tissue culture medium comprising in parts by weight:
   (a) amino acids including 21 parts of arginine, 12 parts of cystine, 9.6 parts of histidine, 26.2 parts of isoleucine, 26.2 parts of leucine, 36.5 parts of lysine, 7.5 parts of methionine, 16.5 parts of phenylalanine, 23.8 parts of threonine, 4.1 parts of tryptophan, 18.1 parts of tyrosine, and 23.4 parts of valine;
   (b) 1000 parts of glucose;
   (c) inorganic salts including 6800 parts of NaCl, 400 parts of KCl, 200 parts of $CaCl_2$, 93.5 parts of $MgSO_4$, and 115 parts of $NaH_2PO_4$;
   (d) sources of vitamins including 1 part of thiamine, 0.1 part of riboflavin, 1 part of pyridoxal, 1 part of nicotinamide, 1 part of pantothenate, 1 part of folic acid, 2 parts of inositol, 1.8 parts of choline bitartrate, and 1 part of biotin; and
   (e) a buffering agent including 100 parts of sodium succinate and 75 parts of succinic acid.

2. An autoclavable nutrient composition for use in an animal tissue culture medium comprising in parts by weight:
   (a) amino acids including 105 parts of arginine, 24 parts of cystine, 31 parts of histidine, 52 parts of isoleucine, 52 parts of leucine, 58 parts of lysine, 15 parts of methionine, 32 parts of phenylalanine, 48 parts of threonine, 10 parts of tryptophan, 36 parts of tyrosine, and 46 parts of valine;
   (b) 1000 parts of glucose;
   (c) inorganic salts including 6800 parts of NaCl, 400 parts of KCl, 200 parts of $CaCl_2$, 93.5 parts of $MgSO_4$, and 115 parts of $NaH_2PO_4$;

(d) sources of vitamins including 1 part of thiamine, 0.1 part of riboflavin, 1 part of pyridoxal, 1 part of nicotinamide, 1 part of pantothenate, 1 part of folic acid, 2 parts of inositol, and 1.80 parts of choline bitartrate; and (e) a buffering agent including 100 parts of sodium succinate and 75 parts of succinic acid.

3. In a nutrient composition for use in an animal tissue culture medium containing:

(a) a plurality of amino acids selected from the group consisting of arginine, cystine, histidine, isoleucine, leucine, lysine, methionine, phenylalanine, threonine, tryptophan, tyrosine, and valine;

(b) a plurality of water-soluble salts that are nontoxic to the cells to be cultured and that supply inorganic ions selected from the group consisting of phosphate, calcium, magnesium, and sodium ions;

(c) a plurality of water-soluble sources of vitamins selected from the group consisting of choline salts, thiamine, riboflavin, pyridoxal, nicotinamide, pantothenate, folic acid, inositol, and biotin; and (d) a source of carbohydrate; the improvement which comprises including in said composition an acidic buffering agent comprising a mixture of sodium succinate and succinic acid in an amount sufficient to maintain the pH of the composition at between about 3.5 and 5.0 when the composition is dissolved in purified water and heat sterilized.

4. The composition of claim 3 in which the buffering agent is present in the composition in an amount sufficient to maintain the pH of said composition at from about 4.0 to 4.5.

5. The composition of claim 3 in which the nutrient composition is selected to contain all the amino acids and water-soluble sources of vitamins recited in clam 18, and the buffering agent is present in an amount sufficient to maintain the pH of the composition at between about 4.0 and 4.5.

6. In a method for preparing a tissue culture medium for culturing animal cells from a powdered nutrient composition including:

(a) a plurality of amino acids selected from the group consisting of arginine, cystine, histidine, isoleucine, leucine, lysine, methionine, phenylalanine, threonine, tryptophan, tyrosine, and valine;

(b) a plurality-soluble salts that are nontoxic to the animal cells to be cultured and that provide inorganic ions selected from the group consisting of phosphate, calcium, magnesium, and sodium ions;

(c) a plurality of water-soluble sources of vitamins selected from the group consisting of choline salts, thiamine, riboflavin, pyridoxal, nicotinamide, pantothenate, folic acid, inositol, and biotin; and (d) a source of carbohydrate; the improvement which comprises the steps of: incorporating in the nutrient composition an acidic buffering agent comprising sodium succinate and succinic acid in an amount sufficient to maintain the pH of an aqueous solution of the composition at between about 3.5 and 5.0 during autoclaving; adding water to said nutrient composition and autoclaving the solution to produce a sterilized nutrient solution; and aseptically adding to said solution a sterilized glutamine and bicarbonate ions to form a medium for culturing animal cells.

7. The method of claim 6 in which sufficient buffering agent is added to maintain the pH of the solution of the nutrient composition at about 4.0 to 4.5 during autoclaving.

8. In a process for the preparation of an autoclavable nutrient composition for use in an animal tissue culture media containing:

(a) a plurality of amino acids selected from the group consisting of arginine, cystine, histidine, isoleucine, leucine, lysine, methionine, phenylalanine, threonine, tryptophan, tyrosine, and valine;

(b) a plurality of water-soluble salts that are nontoxic to the animal cells to be cultured and that supply inorganic ions selected from the group consisting of phosphate, calcium, magnesium, and sodium ions;

(c) a plurality of water-soluble sources of vitamins selected from the group consisting of choline salts, thiamine, riboflavin, pyridoxal, nicotinamide, pantothenate, folic acid, inositol, and biotin; and (d) a source of carbohydrate;

the improvement which comprises buffering the composition with an acidic buffering agent to maintain the pH of the composition at between about 3.5 and 5.0 when the composition is dissolved in purified water and heat sterilized.

9. The process of claim 8 in which the composition is buffered at a pH of from about 4.0 to 4.5.

10. In a method for preparing a tissue culture medium from a homogeneous powdered nutrient composition containing a plurality of water-soluble ingredients including the vitamins, amino acids, carbohydrate, and inorganic salts essential for the cultivation of mammalian cells, the improvement which comprises the steps of:

(a) buffering the powdered nutrient composition to maintain the pH of an aqueous solution of the ingredients at a pH of about 3.5 to 5.0 during heat sterilization;

(b) adding water to said nutrient composition and heat sterilizing the resulting solution to produce a sterilized nutrient solution; and (c) aseptically adding to said nutrient solution sterilized glutamine and bicarbonate ions to form a medium for culturing animal cells.

11. The method of claim 10 in which said buffering maintains the pH of the aqueous solution of said composition at about 4.0 to 4.5 during heat sterilization.

References Cited

Greene et al.: Proc. Soc. Expt. Biol. Med., vol. 118, pp. 122–128, 1965.

Yamane et al.: Tohoku J. Exp. Med., vol. 92, pp. 311–323, 1967.

RICHARD L. HUFF, Primary Examiner

UNITED STATES PATENT OFFICE
CERTIFICATE OF CORRECTION

Patent No. 3,579,423            Dated May 18, 1971

Inventor(s) ISAO YAMANE ET AL

It is certified that error appears in the above-identified patent and that said Letters Patent are hereby corrected as shown below:

Claim 5, column 7, line 35, "clam 18" should be -- claim 3 --.

Claim 6, column 7, line 46, "(b) a plurality-soluble" should be

-- (b) a plurality of water-soluble --.

Signed and sealed this 3rd day of August 1971.

(SEAL)
Attest:

EDWARD M. FLETCHER, JR.           WILLIAM E. SCHUYLER, JR.
Attesting Officer                     Commissioner of Patents